June 11, 1935.  R. T. GILLETTE  2,004,787
MANDREL
Filed Dec. 1, 1934
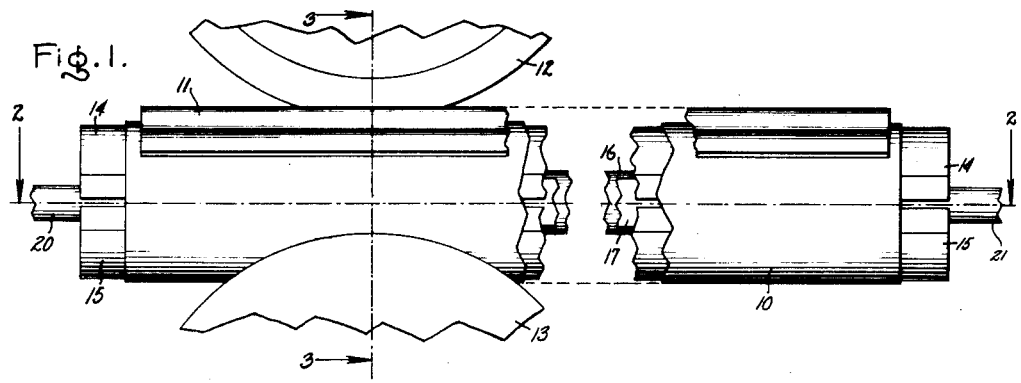
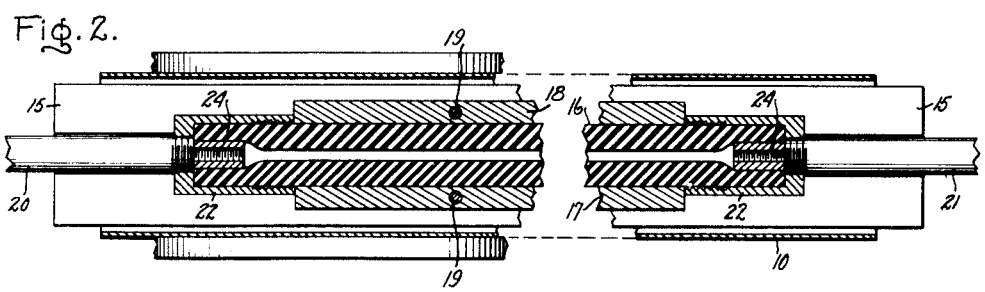
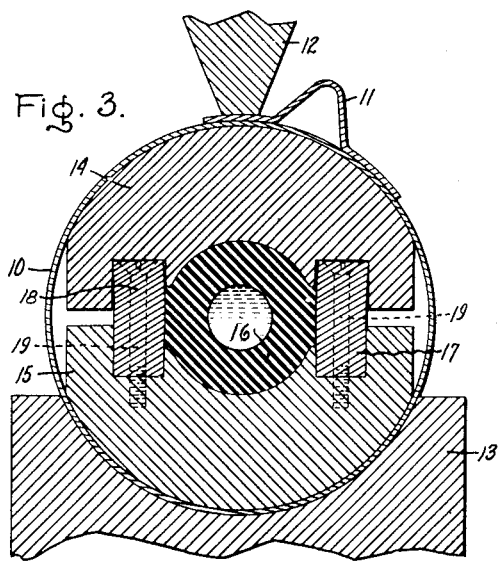
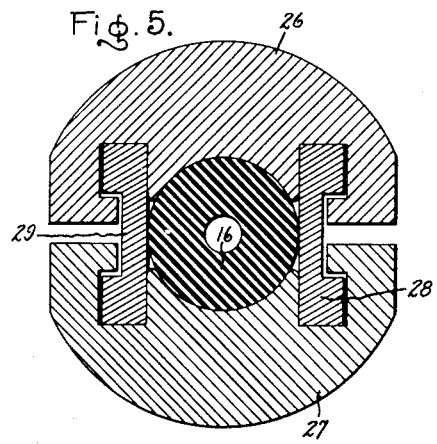
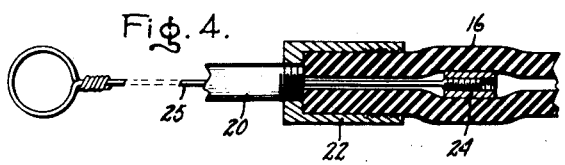
Inventor:
Robert T. Gillette,
by Harry E. Dunham
His Attorney.

Patented June 11, 1935

2,004,787

UNITED STATES PATENT OFFICE 2,004,787

MANDREL

Robert T. Gillette, Scotia, N. Y., assignor to General Electric Company, a corporation of New York Application December 1, 1934, Serial No. 755,644

7 Claims. (Cl. 219—4)

My invention relates to mandrels particularly adapted for reinforcing and supporting tubes subjected during manufacturing operation to tool pressures that would otherwise be destructive to the tubes.

It has heretofore proved impractical to form tube supporting mandrels of any considerable length owing to the difficulty of removing them from the tubes at the completion of the manufacturing operation in which they are employed.

It is an object of my invention to provide a mandrel which when of considerable length may be collapsed and readily withdrawn from a tube.

It is a further object of my invention to provide a mandrel in which the work supporting members are held in assembled position by a freely sliding connection which is tightened to form a good electrical connection between the parts when the mandrel is expanded to reinforce and support the work.

A further object of my invention is to provide a mandrel of particular utility for reinforcing tubes subjected to or manufactured by resistance welding operations.

Further objects of my invention will become apparent from a consideration of the following description taken in connection with the accompanying drawing, Fig. 1 of which illustrates one embodiment of my invention and its use for reinforcing a tube subjected to a resistance welding operation; Fig. 2 of which is a sectional view along the lines 2—2 of Fig. 1; Fig. 3 of which is a section along the lines 3—3 of Fig. 1; Fig. 4 of which is a detailed view showing the manner of making an assembly of certain parts of the mandrel of Figs. 1, 2 and 3; and Fig. 5 of which is a sectional view illustrating a modification of the mandrel illustrated in Figs. 1, 2 and 3.

The mandrel illustrated in Figs. 1, 2 and 3 is employed for supporting a tube 10 to the exterior surface of which a drip strip 11 is being attached by a resistance welding operation. Current and pressure are supplied to the work parts through electrodes 12 and 13 and the mandrel functions to support the work against the pressure exerted by the electrodes 12 and 13 and to conduct a major portion of the current between these electrodes.

The mandrel comprises a plurality of electrically conductive work supporting members 14 and 15 which are forced into engagement with the work by means of an elastic flexible tube 16 which may be expanded by means of a fluid, for example, water. When the tube 16 is not expanded by fluid pressure the work supporting members 14 and 15 are joined by a freely sliding connection formed by keylike conductors 17 and 18 which are supported in recesses in these members. When the tube 16 is expanded by the application of fluid pressure the freely sliding connection between conductors 17 and 18 and members 14 and 15 is tightened to form a good electrical connection. The arrangement of parts when the tube has been expanded into a work supporting position is illustrated in Fig. 3. It will be noted that the tube 16 in expanding has forced the members 14 and 15 against the inside wall of the tube 10 and has forced the keylike conductors 17 and 18 outwardly against the retaining walls of the recesses within which these keys are located. The conductors 18 and 17 are fairly tightly fitted in the recesses in member 15 in which they are held by screws 19 and are more loosely mounted in the recesses in the member 14. The pressure exerted on the conductors 17 and 18 by the expanded tube 16 thus springs them into a position such as illustrated in the drawing which for the purposes of illustration have been greatly exaggerated.

The tube 16 is connected to a source of fluid pressure through tubes 20 and 21. These tubes are connected to the tube 16 by capping sleeves 22 within which the end of the tube 16 is held by perforated clamping plugs 24. The manner in which these clamping plugs are inserted in their clamping positions within the sleeves 22 is illustrated in Fig. 4. As noted in this figure the end of the tube 16 is inserted within a sleeve 22 when the plug 24 has been displaced a sufficient distance from the end of the tube 16 to permit the free entry of the tube into the sleeve. After the end of the tube has been placed within the sleeve the plug 24 is drawn within the sleeve into the position illustrated in Fig. 2. This operation is performed by means of a rod 25 which is threaded at its end to engage the threaded perforation in the plug 24. By means of rod 25 plug 24 can be pulled from the position illustrated in Fig. 4 to the position within the sleeve 22 illustrated in Fig. 2.

It is to be noted that the inside surface of the sleeve 22 is serrated over that portion thereof extending beyond the plug 24 to the end of the sleeve. These serrations perform an important function in holding the tube 16 in place in the sleeve 22. When fluid pressure is applied to the tube 16 to expand it the exterior wall of the tube within the sleeve 22 is firmly pressed into engagement with these serrations which hold the end of the tube in place within the sleeve. The clamping plug 24 also holds the tube in place within the sleeve 22 but the serrations on the inside surface of the sleeve 22 effectively hold the tube in place in the sleeve when fluid under pressure is supplied to the tube for expanding it. It is because of these serrations that enormous pressures may be applied to the tube 16 without breaking the joint between the end of the tube and the sleeve 22.

In the arrangement above described the expanding means 16 is a heavy walled tube of soft rubber and the work supporting members 14 and 15 as well as the keys 17 and 18 are formed of solid copper. When the parts are in the position illustrated in Fig. 3 it will thus be seen that the mandrel constitutes a good electrical conductor for transmitting the welding current between the electrodes 12 and 13 independently of the work supported thereon.

The tubes 20 and 21 are connected to a suitable source of fluid pressure through valves capable of controlling the admission and holding of fluid under pressure within the expansible tube 16.

In using the mandrel, it is first slid through the tube, one of the valves in tubes 20 or 21 is closed, and the other tube is then connected to a suitable source of fluid pressure. After sufficient pressure has been applied to the tube 16 to expand the mandrel into the desired work supporting position the remaining valve in the other tube connected thereto is closed and the mandrel as a whole may then be disconnected from the source of fluid pressure and transported to the machine or machines in which the welding operation or operations is to be performed. The mandrel is readily removed from the tube by opening one of the valves to release the fluid pressure in tube 16 and thus permit the mandrel to collapse.

The keys 17 and 18 of the mandrel illustrated in Figs. 1, 2 and 3 in no way limit the separation of the work supporting members 14 and 15. Consequently, the operator in handling the mandrel must hold the parts in the desired assembled position prior to inserting them within the work tube. In Fig. 5, however, I have illustrated an arrangement in which the keys also serve to limit the separation of the work supporting members. In this figure the parts have been shown in the positions they assume before fluid pressure is applied to the tube 16. The work supporting members 26 and 27 are held together by keys 28 and 29 which have enlarged portions on their ends which fit in grooved recesses so constructed as to limit the separation of the members by reason of their engagement with the enlarged portions of the keys 28 and 29. As illustrated in this drawing, sufficient clearance is provided between the work supporting members 26 and 27 and keys 28 and 29 to permit the desired separation of these members as well as the freely sliding connection between these parts when the tube 16 is not expanded by the application of fluid pressure thereto. In the modification illustrated in Fig. 5 as in the modification previously described the expansion of the tube 16 forces the work supporting members 26 and 27 against the work and, at the same time, tightens the freely sliding connection between the keys 28 and 29 and these members, thus forming a good electrical circuit between the work supporting members. The assembly shown in Fig. 5 may be made by longitudinally inserting the keys 28 and 29 into the recesses formed in the work supporting members 26 and 27. Once the assembly has been made the mandrel may be freely handled, since the operator does not find it necessary to hold the parts in assembled position prior to inserting them within the tube.

In the arrangement illustrated in Figs. 1, 2 and 3 both capping sleeves 22 have been provided with openings communicating with tubes 20 and 21. It is, of course, apparent that only one of the tubes 20 and 21 is needed for supplying fluid under pressure to the tube 16 and, consequently, one of the sleeves 22 may be unperforated and act as a closure for one end of the tube 16. It is also apparent that the tube 16 may be formed of any suitable material other than rubber, and that the work supporting members may be given any configuration corresponding to the configuration of the work part for which it is intended as a support.

If a construction such as illustrated in Fig. 5 is employed, it is also apparent that the mandrel may be used for the formation of tubes by the lap welding process. The limited separation of the work supporting members in such case will serve to size the tube. The fluid pressure which it is possible to supply to the tube 16 renders the mandrel sufficiently rigid for the accomplishment of this purpose.

It is to be noted that a mandrel constructed in accordance with my invention may comprise a very few parts which are of sufficient strength to withstand strain and rough usage as well as the heat resulting from the resistance welding operation performed on the work parts supported thereby. It is also to be noted that the assembly is such that when the mandrel is in its expanded work supporting position it constitutes a good electrical connection for the flow of welding current transverse to the mandrel.

Various modifications of my invention will occur to those skilled in the art in view of the particular embodiments above illustrated and described. It is to be understood, therefore, that I intend to cover all such modifications as fall within the true spirit and scope of my invention as pointed out in the claims annexed hereto.

What I claim as new and desire to secure by Letters Patent of the United States is:

1. A mandrel comprising a plurality of electrically conductive work supporting members, electrically conductive means forming a freely sliding connection between said members and expanding means acting when expanded to force said work supporting members against the work and to tighten the freely sliding connection between said electrically conductive means and said work supporting members.

2. A mandrel comprising a plurality of electrically conducting work supporting members, electrically conductive keys forming a freely sliding connection between said members, an expansible tube enclosed by said members and said keys and acting when expanded to force said members against the work and to tighten the freely sliding connection between said keys and said members.

3. A mandrel comprising a plurality of electrically conductive work supporting members, electrically conductive keys forming a freely sliding connection between said members and acting to limit the separation of said members, expanding means acting when expanded to separate said work supporting members and to tighten the freely sliding connection between said keys and said members.

4. A mandrel comprising a plurality of electrically conductive members adapted to form a support for substantially the entire inside surfaces of a work part, electrically conductive keys forming a freely sliding connection between said members, an elastic flexible tube enclosed by said members and said keys and acting when expanded to force said members against the work and to tighten the freely sliding connection between said keys and said members, and means for supplying fluid under pressure to said tube.

5. A mandrel comprising a plurality of electrically conductive work supporting members, electrically conductive keys forming a freely sliding connection between said members, an expansible tube enclosed by said members and said keys and acting when expanded to force said members against the work and to tighten the freely sliding connection between said keys and said members, sleeves having inside serrated surfaces enclosing the ends of said expansible tube, perforated clamping plugs within the end portions of said expansible tube inserted in said sleeves, and tube connections extending from said sleeves to the ends of said mandrel.

6. A mandrel comprising a plurality of electrically conductive work supporting members, electrically conductive keys forming a freely sliding connection between said members, an expansible tube enclosed by said members and said keys and acting when expanded to force said members against the work and to tighten the freely sliding connection between said keys and said members, capping sleeves having inside serrated surfaces enclosing the ends of said expansible tube, plugs, at least one of which is perforated, within the end portions of said expansible tube inserted in said sleeves, and a tube extending from the inside of said capping sleeve enclosing said perforated plug through the end portion of said mandrel.

7. A mandrel comprising a plurality of electrically conductive work supporting members, electrically conductive keys forming a freely sliding connection between said members, an expansible tube enclosed by said members and said keys and acting when expanded to force said members against the work and to tighten the freely sliding connection between said keys and said members, capping sleeves having inside serrated surfaces enclosing the ends of said expansible tube, perforated clamping plugs located within the end portions of said expansible tube inserted in said sleeves, and tubes extending through the end portions of said mandrel and connected to the inside of said capping sleeves in communication with said expansible tube through the perforations in said plugs.

ROBERT T. GILLETTE.